A. HEIMANN & L. FLATOW.
COIN CONTROLLED APPARATUS.
APPLICATION FILED MAR. 21, 1907.
918,548.
Patented Apr. 20, 1909.
4 SHEETS—SHEET 3.
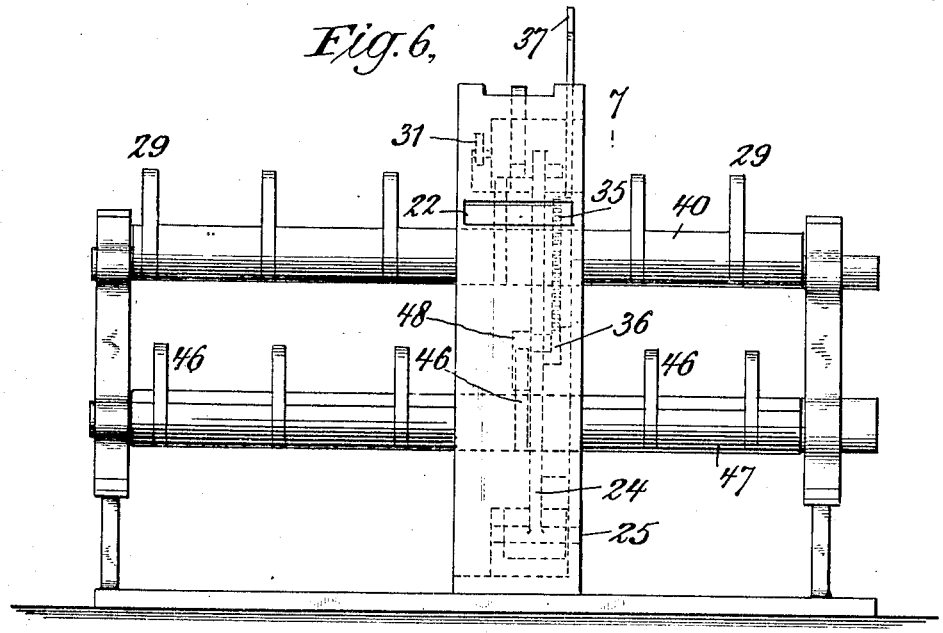
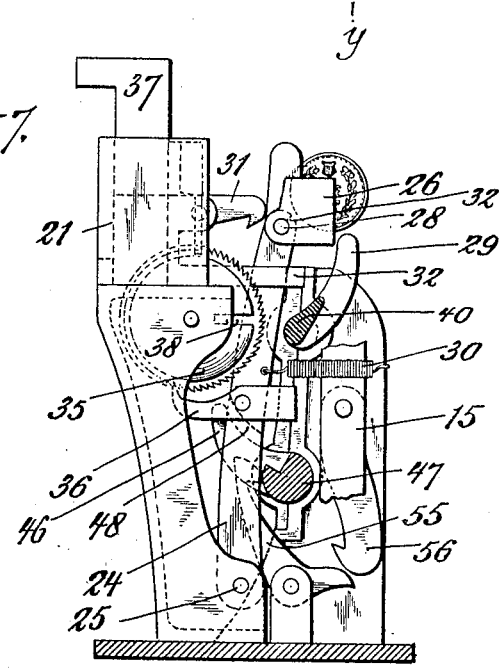

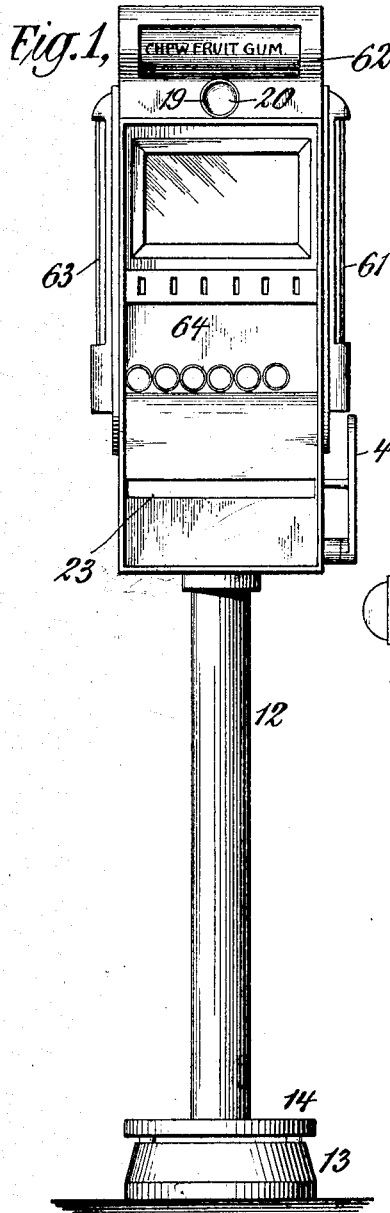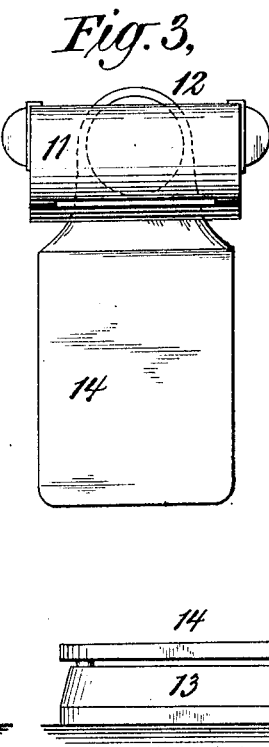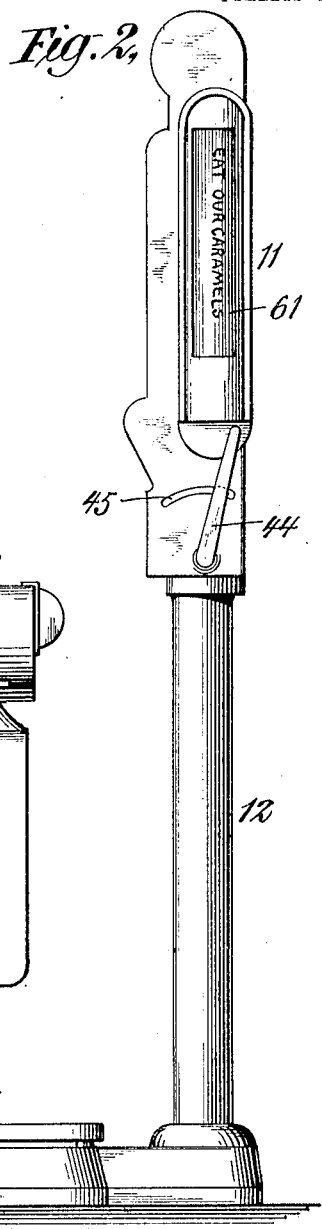

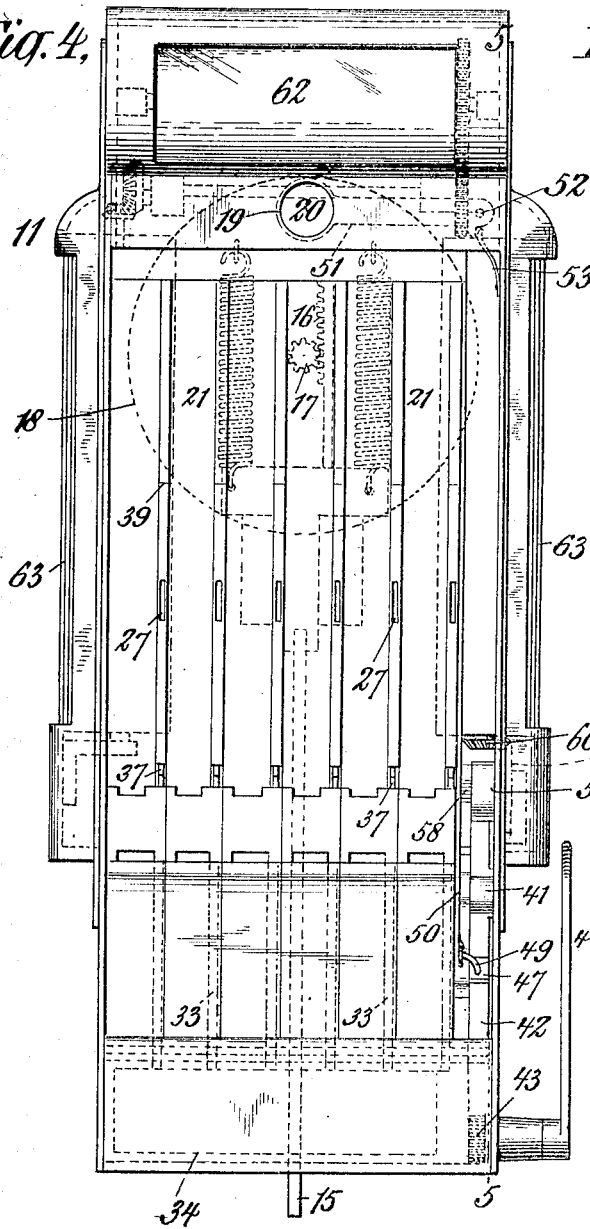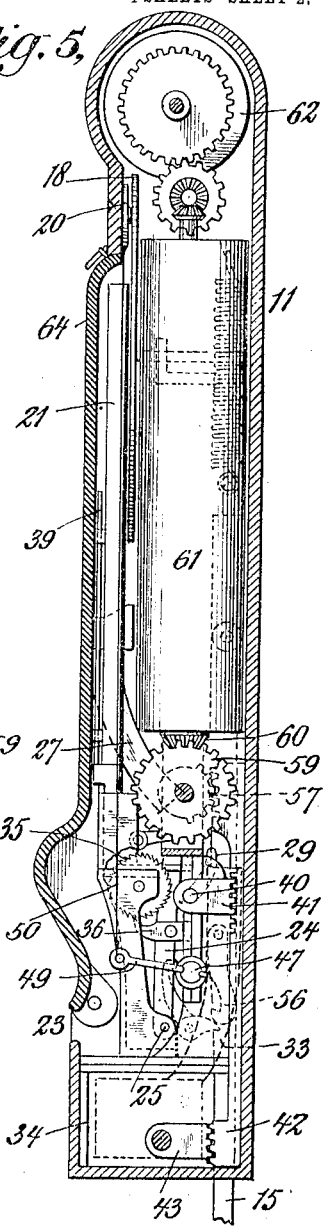

A. HEIMANN & L. FLATOW.
COIN CONTROLLED APPARATUS.
APPLICATION FILED MAR. 21, 1907.
918,548.
Patented Apr. 20, 1909.
4 SHEETS—SHEET 4.
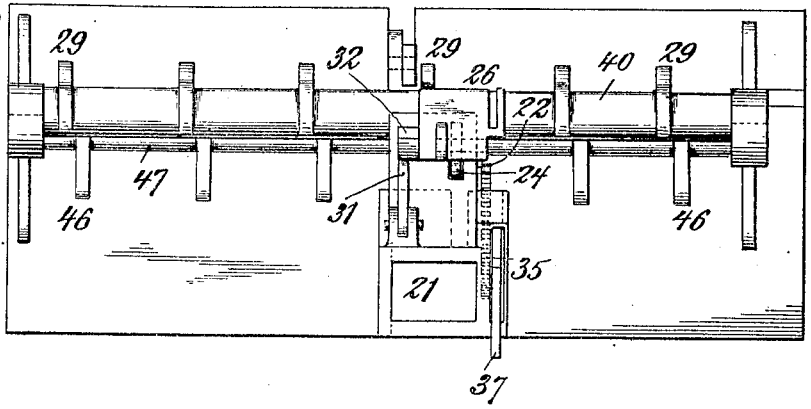
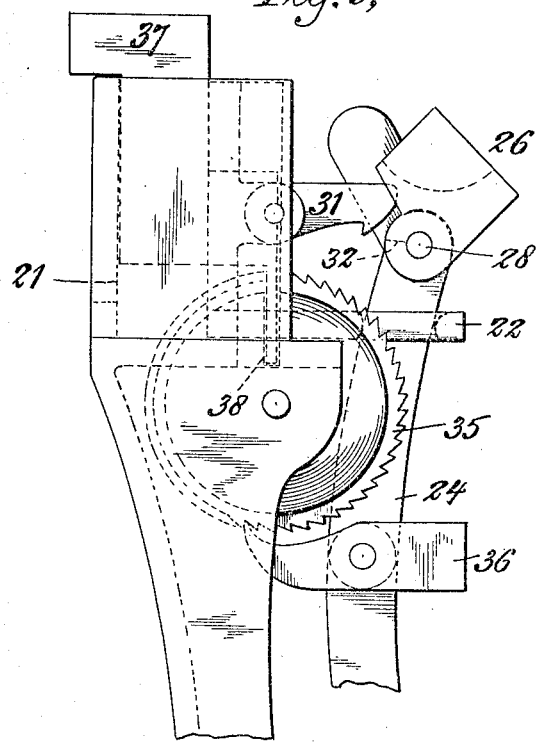
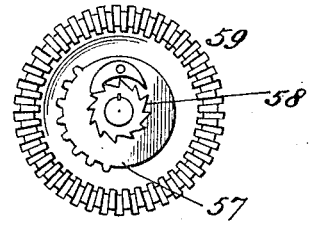
WITNESSES:
INVENTORS
Albert Heimann
+ Leo Flatow
BY
Chapin & Haymond
their ATTORNEYS

UNITED STATES PATENT OFFICE.

ALBERT HEIMANN AND LEO FLATOW, OF NEW YORK, N. Y., ASSIGNORS, BY MESNE ASSIGN-MENTS, TO DOUBLE VALUE VENDING COMPANY, OF NEW YORK, N. Y., A CORPORATION OF DELAWARE.

COIN-CONTROLLED APPARATUS.

No. 918,548.   Specification of Letters Patent.   Patented April 20, 1909.

Application filed March 21, 1907. Serial No. 363,545.

*To all whom it may concern:*

Be it known that we, ALBERT HEIMANN, a citizen of the United States of America, and a resident of the city, county, and State of New York, and LEO FLATOW, a subject of the Emperor of Germany, and a resident of the city, county, and State of New York, have invented certain new and useful Improvements in Coin-Controlled Apparatus, of which the following is a specification, reference being had to the accompanying drawings, forming a part thereof.

Our invention relates to coin controlled apparatus, and particularly to coin controlled vending and weighing apparatus.

Our invention consists broadly in the employment of a single operating member with coin controlled coupling means by which said operating member may be employed for the purpose of simultaneously operating vending apparatus and a weight displaying device.

The device comprises a combined weighing and vending apparatus, but the weighing means is employed for the purpose of weighing only, and is not used for operating any other mechanism whatever. It is important that the weighing means shall be free from connection with other mechanism, for, if not the weighing is liable to be inaccurate owing to the different resistances which may interpose.

The weight displaying device is operated by the operating member at the same time as the vending apparatus is operated thereby, the coin-controlled coupling means coupling both the said devices with the operating member at once. Normally the operating member may be moved freely without it effecting any operation whatever so far as has yet been described, because it is only when the coin-controlled mechanism couples it with the vending and weight displaying devices that it affects either of them, but, as a further portion of our invention, we employ the said operating member for the purpose of operating advertising apparatus, so that every time the said operating member is moved, movement is transmitted to the said advertising apparatus. This movement of the advertising apparatus is effected by the operating member whether the same be coupled with the vending apparatus and the weighing apparatus, or not. In other words, the advertising devices are preferably in constant operative connection with the said operating member, while the other apparatus is only connected therewith by the coin-controlled coupling means.

The operation of the machine will then be as follows: The operating member, which may conveniently be in the form of a handle or lever, may be moved at any time, producing thereby corresponding movements of the advertising matter. By inserting a coin and then moving the said handle or lever, articles will be discharged from the machine at the same time as the advertising matter is moved. Further, if at the time the operating handle is manipulated, the operator is standing upon the platform of the weighing scales and a coin of the proper denomination inserted in the machine, the weight of the operator will be displayed, an article will be discharged from the machine, and the advertising devices will be operated, all at the same time.

The preferred form of our apparatus includes a plurality of vending devices, a plurality of individual coin-controlled mechanism therefor, a common operating member for operating any of the said vending devices, and coupling means for bringing about the operation of the weight displaying means when any one of the vending devices is operated.

Our invention also consists in many novel details of construction and combinations of parts as will more fully appear hereinafter.

In order that our invention may be fully understood, we will now proceed to describe an embodiment thereof, having reference to the accompanying drawings illustrating the same, and will then point out the novel features in claims.

In the drawings: Figure 1 is a view in front elevation of the machine. Fig. 2 is a view in side elevation of the same. Fig. 3 is a top view thereof. Fig. 4 is a view in front elevation on a larger scale of the upper portion of the machine, with the front plate removed. Fig. 5 is a view in longitudinal vertical section through the parts shown in Fig. 4, the plane of section being taken substantially upon the line 5—5 in such figure. Fig. 6 is a front view of certain parts of the operating mechanism, particularly including portions of the vending apparatus. Fig. 7 is a view in central vertical section of the parts shown in Fig. 6, the plane of section being taken substantially upon the line 7—7 in such figure.

Fig. 8 is a top view of the parts shown in Fig. 6. Fig. 9 is a detail view upon a still larger scale of certain portions of the coin-controlled mechanism, including the locking device which is brought into operation when the magazine is empty. Fig. 10 is a detail view showing gearing employed between the operating member and the advertising apparatus.

The machine as a whole comprises a casing 11 mounted upon a standard 12, said standard provided with a foot 13. A scales platform 14 is arranged above a portion of the foot 13, said scales platform provided with a rod or connection 15, by which the same is connected with resistance springs or other weighing mechanism as may be desired, said rod or connection serving also to operate a rack 16 which is arranged in mesh with a pinion 17. The pinion 17 is connected to a disk 18 which serves as an index dial, the said disk having figures thereon in consecutive order to indicate different weights which the platform may carry. The figure corresponding to the weight carried by the platform is exposed through a window or opening 19 in the casing 11 when a shutter 20, with which the said window or opening is provided, is withdrawn. The casing 11 contains a plurality of chutes or magazines 21 for containing articles or packages to be vended. Each chute or magazine is provided with a coin-controlled mechanism through the medium of which articles may be delivered therefrom. As the several mechanisms for all the magazines or chutes are precisely similar, a description of one of them will serve as a description of all.

Each chute or magazine 21 is provided at its lower end with an ejector 22, which is arranged to be reciprocated across the bottom of the said chute or magazine to eject the articles therefrom one at a time. As each article is ejected the remaining articles descend by gravity for the next succeeding article to be ejected in its turn. The ejected article drops inside the case and may be reached from the outside through the mouth or outlet 23. The ejector is actuated by means of a lever 24 fulcrumed or pivoted at 25. This lever is provided at its upper end with a coin-actuated engaging piece or gravity lock 26 (see particularly Figs. 7, 8 and 9), the same being pivotally secured at 28 upon the said lever and arranged opposite the discharge mouth of a coin chute 27 which is mounted in the casing 11, being so located as to receive a coin as it is discharged from the said chute. The said engaging piece 26 normally rests in the position in which it is shown in Fig. 9 in the drawings, but when it receives a coin it is overbalanced thereby, being then caused to turn upon its pivotal support 28 to the position in which it is shown in Fig. 7 of the drawings. When in the latter position the said engaging device is brought to a point directly in front of an actuator 29, being at such time directly in the path of movement of the said actuator. When the said gravity lock is in such a position, and the actuator 29 is moved forward, the lever 24 will be operated and thereby caused to so move the slide or ejector 22 as to eject an article from the magazine in which it is mounted. When the said engaging piece or gravity lock is in its normal position, that is to say the position in which it is shown in Fig. 9, it will be out of the path of movement of the actuator, and movements of the said actuator will not affect same or cause any movement to be imparted to the corresponding lever and slide. The return movement of the lever 24, and hence of the slide or ejector 22, is effected by means of a spring 30.

For the purpose of returning the gravity lock to its normal position after it has been overbalanced by a coin, we have provided a hook or catch 31 pivoted to a fixed point in the machine and arranged, upon the forward movement of the lever 24, to engage a notch or shoulder 32 with which the gravity lock 26 is provided. The said hook or catch 31 is caused to engage the shoulder 32 when the lever is moved forward, whereby, upon moving the lever backward, the same will rock the gravity lock upon its pivotal support to return it to its normal position, as will be well understood. The part 26 is so arranged as to rest by gravity in either position to which it is moved, that is to say, its center of gravity is moved from one side of the axis of its pivotal support to the other when it is shifted from rest to operated position. After a coin has operated to throw the gravity lock over, it will drop down and pass through a chute 33 into a coin receiving box or drawer 34 of any suitable type, and which may be normally locked in position in the machine, but arranged to be removed when desired in any well known manner.

In order to prevent the mechanism from being operated when a magazine becomes empty, we have provided a locking means 35 rotatively mounted in the machine, a pawl 36 carried by the lever 24, and a locking slide 37. The locking slide 37 is mounted adjacent to the foot of the chute or magazine 21, and has a part adapted to be received by a slot or recess 38 in the ratchet wheel 35. The ratchet wheel may conveniently have a number of teeth equal to the number of articles or packages in the adjacent magazine, and may be thus made to act as a counter. A step by step movement is imparted thereto as the lever 24 is operated, until, finally, as the last article is discharged from the magazine, the slot or recess 38 will be brought opposite to the portion of the slide 37 arranged to engage therewith, and the said slide will move by gravity to such engagement. This will lock the ratchet wheel, which, by engagement with the pawl 36, will prevent further operations of the lever 24. We employ a shutter 39 in connection with the slide 12, which is allowed to drop when the slide moves into engagement with the ratchet wheel to thereby close the coin slot. As previously explained, there are a plurality of chutes or magazines and coin-controlled mechanisms similar to that just described, and for each said magazine and connected parts is an actuator similar to the actuator 29 just described. These actuators are arranged upon a common shaft 40, said shaft provided with a gear segment 41, the teeth of which are arranged in mesh with the teeth of a rack bar 42. The rack bar 42 is also provided with teeth arranged in mesh with a gear segment 43 secured fast to a handle or lever 44 arranged upon the outside of the machine and which serves as an operating member for the machine. The movement of the said operating member is limited by means of a guide piece 45. The operation of the said handle or lever 44 will, through the medium of the gear segments 41 and 43, the rack bar 42 and the actuator shaft 40, operate all the actuators, but unless the engaging piece or gravity lock of any one of the levers 24 for the different magazines has been acted upon by a coin there will be no operation of the vending mechanism. If any engaging piece or gravity lock has been so operated, an article will be discharged from the corresponding magazine upon such operation of the handle or lever, the coin-operated mechanism thus acting as coupling means for connecting the vending device with the operating member.

The coupling means, by which the operating lever is connected with the means for indicating the weight carried by the scales platform at the time the said member is operated, consists of a plurality of arms 46 carried by a common shaft 47, said arms arranged contiguous to cam pieces 48 with which the said levers 24 are provided. The shaft 47 is also provided with a lever arm 49 (see Figs. 4 and 5), which is connected by means of a connecting wire or rod 50 with an arm or lever 51 which carries the shutter 20. The said arm or lever is pivoted at 52 to the casing 14, and is normally held by a spring 53 in a position to close the window 19. When the lever 24 moves forward it rocks the shaft 47 by means of the cam 48 carried by it, and the corresponding arm 46 upon the shaft thereby pulls upon the wire or rod 50 to swing the arm 27 downward against the tension of the spring 29, and thereby to remove the shutter 20 from in front of the window 19. The movement of the shutter will display the proper indicating figure carried by the dial through the opening or window 19, whereby the weight of the person standing upon the platform may be readily ascertained. The shaft 47 has a shouldered portion 54 arranged to be engaged by a hook or catch 55, the said hook or catch serving to hold the shaft 47 in its rocked position and to prevent the immediate return of the shutter 20. The movement of the parts to their normal positions, and hence the return of the shutter to a position across the window 19, is effected by means of a pawl 56 which is carried by the aforesaid rod or connection 15, said pawl passing beneath a projecting toe of the hook or catch 55 as the rod or connection 15 descends when a person steps upon the scales platform 14. The said pawl 56 engages the toe or projection of the hook or catch 55 as the rod or connection 15 moves upward again when the person leaves the platform, thereby releasing the said hook or catch from engagement with the shouldered portion of the shaft 47, permitting the parts to return to normal under the influence of the spring 29.

From the foregoing it will be understood how the operation of any one of the coin-controlled mechanisms of the vending devices will also act as coupling means to connect the weight displaying device with the operating lever, so that every time a coin is received in the machine the weight of a person standing upon the platform will be displayed and an article discharged from the magazine corresponding with the coin chute in which the coin is received. It will also be understood, however, that the vending will be effectuated whether the operator stands upon the weighing scales platform or not, because the operation of the vending apparatus in no way depends upon the operation of the weighing apparatus.

The rack bar 42, which, it will be remembered, is in constant operative connection with the handle or lever 44, is provided with gear teeth which engage a gear segment 57. The gear segment 57 carries a pawl through which step by step movements of rotation may be transmitted to a ratchet wheel 58 (see particularly Fig. 10), said ratchet wheel being keyed or fixed to a gear-wheel 59 having gear connection 60 with a roller 61. The roller 61 may carry advertisements or other matter, and is connected by miter gearing with a horizontal roller 62, in tu.n connected by suitable gearing with another roller 63. As these rollers are rotated suitable matter or advertisements thereon are brought into view. The rollers may be made to rotate at different rates of rotation or not, in accordance with the gear connection between them. The casing will, of course, have suitable side openings or windows for exposing the advertisements, and, if desired, the interior of the magazines or other parts, and the said casing may be suitably provided with mirrors and other wise decorated, as is common in this class of machines. Furthermore, the front portion of the casing may be formed as a removable part 64, whereby access may be had to the magazines for re-charging them, and to the mechanism for repairs, etc.

What we claim is:

1. A coin controlled apparatus comprising a chute, a pivoted and upwardly extended gravity lock in the line of the chute, an actuator into reach of which the lock is moved by a coin from the chute, and mechanism actuated by the lock when in reach of or moved by the actuator, said lock being made to remain at rest at either side of its pivot.

2. A coin controlled apparatus comprising a chute, a gravity lock made to tilt to opposite sides of its vertical position and placed at the chute, an actuator into reach of which the lock is moved, and a rack and handle for moving the actuator.

3. A coin controlled apparatus comprising a chute, an actuator, a lock piece adapted to remain in engaging and disengaging position and thrown into engaging position for the actuator by a coin from the chute, a gear and rack for the actuator and a segment and handle for moving the rack.

4. A coin controlled apparatus comprising an ejector, a lever for the ejector, a lock piece on the lever, and an actuator, said lock piece being adapted to be moved to engaging position by a coin inserted into the apparatus and then to remain in engaging position.

5. A coin controlled apparatus comprising an ejector, an actuating lever for the ejector, a lock piece pivoted on the upper end portion of the lever to fall to and remain at either side thereof; and a handle or the like to engage the lock when in engaging position at one side of the lever.

6. A coin controlled apparatus having an ejector and lever therefor, a pivoted lock piece adapted to tilt to and remain at either side of its pivot, a coin chute made to direct a coin for tilting the lock in one direction, and returning means mounted independently of the lock to move the same in another direction.

7. A coin controlled apparatus comprising an ejector, an actuator for the ejector, a coin actuated or tilted lock for engaging the actuator to connect the same with the ejector, and a catch for returning or moving the lock to inactive position on its return.

8. A coin controlled apparatus comprising an ejector, an actuator for the ejector, a coin actuated lock comprising arms, one of which is adapted to be moved into reach of the actuator for connecting the same to the ejector, and a catch for engaging another arm of the lock to move the same to inactive position.

9. A coin controlled apparatus comprising a chute for merchandise, an ejector made to slide through the bottom of the chute to remove the lowermost article in the chute, a delivery chute leading downward to the exterior of the machine, a lever and actuator for the ejector, a coin actuated tilting lock to connect the lever and actuator, and a hook for tilting the lock out of action.

10. A coin controlled apparatus comprising a chute or magazine, an ejector, an actuator for the ejector, a coin actuated tilting lock moving with the ejector and engaged by the actuator, and a gravity hook or catch having a fixed pivot and made to engage the lock to tilt the same out of action.

11. A coin controlled apparatus comprising an ejector, a lever therefor, a coin actuated lock or engaging piece and actuator for the lever, an incline on the lever, a second lever actuated by said incline, and a shutter connected to, and actuated by, said second lever.

12. A coin controlled apparatus comprising an ejector, a lever therefor, an incline on the lever, a second lever actuated by the incline on the first named lever, a shutter, and a connection from the second lever to the shutter, said shutter being normally closed and being opened by said connection whenever the second lever is actuated.

13. A coin controlled apparatus comprising an actuator and lever, an engaging piece for connecting said parts, a second lever actuated by the first named lever and having a notched shaft or fulcrum portion, and a catch or hook for engaging said notch.

14. A coin controlled apparatus comprising a lever and actuator with engaging piece for said parts, a shutter carrying lever, a closing spring for the lever, a shutter opening lever connected to the shutter carrying lever, and an engaging piece on the first named lever to actuate the shutter opening lever.

15. A coin controlled device comprising a lever and actuator connections therefor, a shutter and shutter actuating lever actuated by the first named lever, a catch for the shutter actuating lever and a release for the catch.

16. A coin controlled apparatus comprising a lever and coin actuated moving connection therefor, a shutter, a shutter actuating lever, a gravity or overweighted hook or catch made to engage the shutter actuating lever, and a release for the catch.

17. A coin controlled apparatus comprising a chute with an ejector, a lever for the ejector, a coin tilted engaging piece pivoted at the upper end portion of the lever so as to swing to and remain at either side thereof, an actuator for the lever, and a rack and handle for the actuator.

18. A coin controlled apparatus comprising coin and merchandise chutes, a lever with a tilting engaging piece placed in the path of a coin from its chute and adapted to remain tilted in or out of engaging position, 5 an actuator for engaging said piece when tilted into engaging position, a second chute with receptacle to take the coin when leaving the engaging piece, and an ejector moved by the actuator when moving the engaging device.

ALBERT HEIMANN.
LEO FLATOW.

Witnesses:
D. HOWARD HAYWOOD,
LYMAN S. ANDREWS, Jr.